United States Patent
Sampson

(10) Patent No.: US 9,906,623 B2
(45) Date of Patent: *Feb. 27, 2018

(54) SYSTEM AND METHOD FOR ACCESSING DATA OBJECTS VIA REMOTE REFERENCES

(71) Applicant: Palantir Technologies, Inc., Palo Alto, CA (US)

(72) Inventor: Zachary Lewis Sampson, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,404

(22) Filed: Feb. 27, 2017

(65) Prior Publication Data
US 2017/0171348 A1  Jun. 15, 2017

Related U.S. Application Data

(63) Continuation of application No. 15/161,982, filed on May 23, 2016, now Pat. No. 9,621,676, which is a continuation of application No. 13/411,291, filed on Mar. 2, 2012, now Pat. No. 9,378,526.

(51) Int. Cl.
*G06F 15/16* (2006.01)
*H04L 29/08* (2006.01)
*H04L 29/06* (2006.01)

(52) U.S. Cl.
CPC .............. *H04L 67/32* (2013.01); *H04L 67/10* (2013.01); *H04L 67/28* (2013.01); *H04L 67/42* (2013.01)

(58) Field of Classification Search
CPC ....... H04L 67/306; H04L 67/18; H04L 67/04; H04L 67/10; H04L 67/14; H04L 67/38; H04L 65/1069; H04L 67/1097; H04L 67/20; G06F 17/3087; G06F 17/30867; G06F 12/0813; G06F 17/30362; G06F 17/30575; G06F 3/0613
See application file for complete search history.

(56) References Cited

U.S. PATENT DOCUMENTS

| | | | | |
|---|---|---|---|---|
| 5,724,575 | A * | 3/1998 | Hoover | G06F 17/30575 |
| 7,155,728 | B1 * | 12/2006 | Prabhu | G06F 9/547 |
| | | | | 719/310 |
| 2006/0116991 | A1 * | 6/2006 | Calderwood | G06F 9/547 |
| 2011/0145401 | A1 * | 6/2011 | Westlake | G06Q 10/06 |
| | | | | 709/224 |

* cited by examiner

*Primary Examiner* — Arvin Eskandarnia
*Assistant Examiner* — Thao Duong
(74) *Attorney, Agent, or Firm* — Hickman Palermo Becker Bingham LLP

(57) ABSTRACT

One embodiment of the present invention sets forth a method for providing access to a data object stored on an application server from within a client side machine. The method includes creating a remote reference that is linked to the data object, transmitting the remote reference to an application executing on a second machine, receiving an expression to evaluate that includes the remote reference, accessing at least one element included in the data object via the remote reference, evaluating the expression based on the at least one element to produce a result, and transmitting the result to the application.

19 Claims, 5 Drawing Sheets

SYSTEM AND METHOD FOR ACCESSING DATA OBJECTS VIA REMOTE REFERENCES

BENEFIT CLAIM

This application claims the benefit under 35 U.S.C. § 120 as a Continuation of application Ser. No. 15/161,982, filed May 23, 2016, which is a Continuation of application Ser. No. 13/411,291 filed Mar. 2, 2012 now U.S. Pat. No. 9,378,526, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

BACKGROUND OF THE INVENTION

Field of the Invention

The present disclosure relates generally to data access and analysis and, more specifically, to a system and method for accessing data objects via remote references.

Description of the Related Art

Software applications, such as financial analysis applications, allow users to create and interact with large software data objects. Such data objects organize data relevant to the software application and provide methods that allow operations to be performed on the data.

Typically, a data object accessed by a software application is resident within the memory of the computing device that is allocated to the software application. Large data objects occupy significant portions of the memory allocated to the software application. Thus, a software application that accesses a significant number of data objects, especially large data objects, needs a large amount of memory for storing the data objects. In most cases, memory that is available to a software application is limited, and, in such scenarios, a software application, when accessing large data objects, can suffer performance degradation as well as encounter errors related to out-of-memory exceptions.

As the foregoing illustrates, what is needed in the art is a mechanism for accessing large data objects without occupying significant amount of memory space allocated to the software application.

SUMMARY OF THE INVENTION

One embodiment of the present invention sets forth a method for providing access to a data object stored on an application server from within a client side machine. The method includes creating a remote reference that is linked to the data object, transmitting the remote reference to an application executing on a second machine, receiving an expression to evaluate that includes the remote reference, accessing at least one element included in the data object via the remote reference, evaluating the expression based on the at least one element to produce a result, and transmitting the result to the application.

Advantageously, because an application executing on a client machine can access objects resident remotely, the application avoids maintaining a copy of large data object within the limited memory space allocated to the application within a client-side machine.

BRIEF DESCRIPTION OF THE FIGURES

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Figure 1:
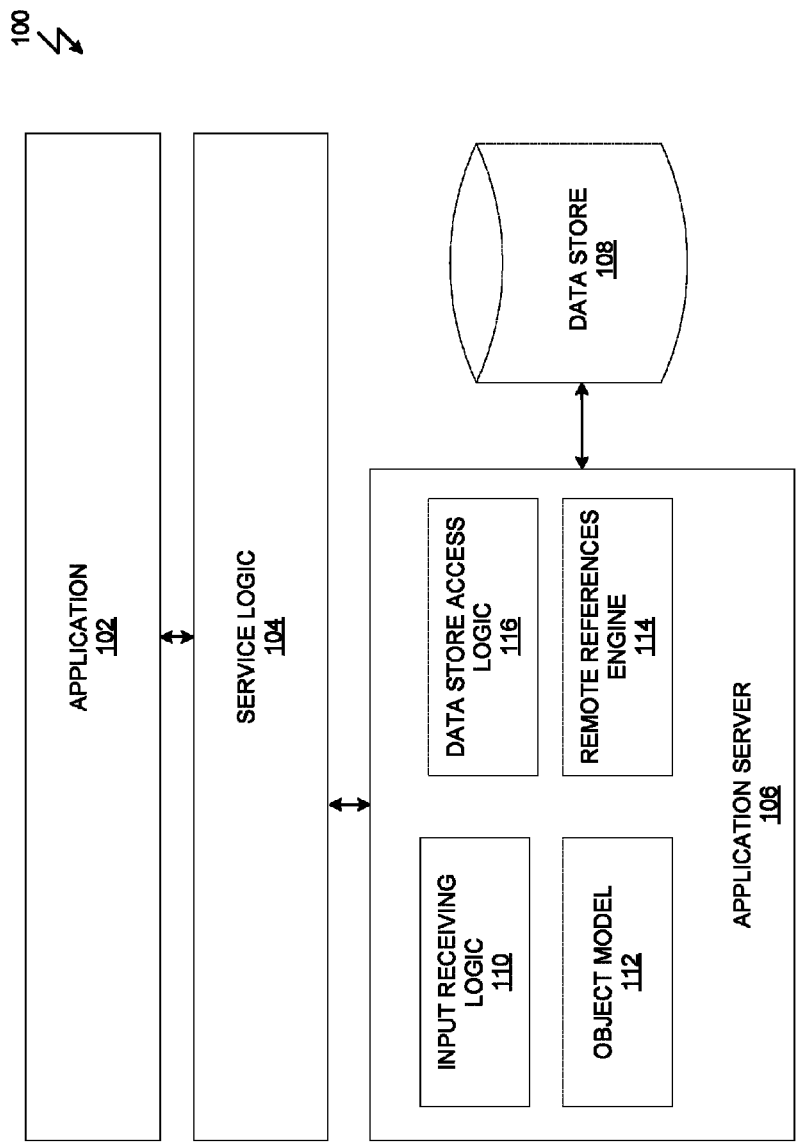
FIG. 1 illustrates a system that enables an application to access rich objects provided by an application server, according to one embodiment of the invention.

FIG. 1 illustrates a system that enables an application to access rich objects provided by an application server, according to one embodiment of the invention. As shown, the system 100 includes an application 102, service logic 104, an application server 106 and a data store 108.

The application 102 is a software program that allows a user to create, analyze and interact with different data objects. The application 102 may be a financial analysis software program, such as a spreadsheet application, or any other software program within which users create and access data objects.

The service logic 104 is an infrastructure layer that, among other things, allows the spreadsheet application 102 to communicate with the application server 106. In one embodiment, the service logic 104 includes a messaging service (not shown) that allows the spreadsheet application 102 and the application server 106 to communicate asynchronously via messages.

The application server 106 includes logical elements such as input receiving logic 110, an object model 112, a remote references engine 114 and data store access logic 116. The application server 106 may be implemented as a special-purpose computer system having the logical elements shown in FIG. 1. In one embodiment, the logical elements comprise program instructions stored on one or more machine-readable storage media. Alternatively, the logical elements may be implemented in hardware, firmware, or a combination thereof.

The input receiving logic 110 receives inputs from different applications executing within the system 100, such as the spreadsheet application 102, via the service logic 104. Inputs include, but are not limited to, processing requests, data access/storage requests and expression evaluation requests. The input receiving logic 110 transmits requests received from the different applications to logical elements within the application server 106 that are configured to process those requests.

The object model 112 is a model that specifies a universe of data objects, relationships between the data objects, higher-order data objects generated based on one or more zero-order data objects in the universe, higher-order data objects generated based on other higher-order data objects, and auxiliary entities related to the universe of data objects. The data objects may be created by users via data object creation mechanisms exposed in different applications, such as the spreadsheet application 102. In one embodiment, the object model 112 includes only references to the data objects and data related to those data objects is stored within the data store 108. Below are some examples of different data objects that are included in the object model 112. Persons skilled in the art would understand that any other data objects can be included in the object model 112.

Examples of Zero-Order Data Objects

Instruments: An instrument is a data object that represents any market traded entity or product of interest, such as a stock (equity), bond, currency, or fund.

Metrics: A metric is a transformation (or function) that receives one type of data (e.g., an object such as an instrument) and returns another type (e.g., another object such as a time series). A metric may perform any form of specified processing, specified computation, related operations such as database queries, network communications and data storing. For example, a metric may receive a particular instrument as input and return a time series of the particular instrument's volume. A metric may also receive one time series for an instrument and return the value of the instrument on a given day. A metric may optionally receive parameters at runtime that influence the execution of logic implemented in the metric. An example of a parameter that can be inputted into a metric to influence the execution of a metric may be a number of days to show a moving average price for MSFT where the metric calculates the moving average price.

Objects that are of a higher order than a zero order can be built using metrics. The input objects and the output objects can be zero-order or higher-order in any combination. The data changes over time. Therefore, if a metric is evaluated at two different times, it may produce different outputs. Alternatively, output objects from one or more of these metrics may be pre-computed/evaluated and stored/cached beforehand. In some embodiments, parameters may be provided to a metric to specify whether a cached object of a metric should be used as input, or whether the output of a metric should be cached or stored.

Time Series: A time series is a programmatic object that represents time-dependent information in any of several forms, including a series of discrete dates or a sequence of time-related values. Where an object model contains a large amount of time-dependent information, many time series may be created in the process of evaluating objects in the object model. For example, an instrument may have a trading history that indicates its values over a period of time. From this trading history (e.g., raw trading data), one or more time series may be created to represent time-dependent information, in any desired resolution (for example, in a time scale of years, months, weeks, days, hours, minutes, seconds).

In some embodiments, a time series may comprise a set of numeric values and a separate set of time values, wherein each numeric value has a corresponding time value in the set of time values. Each such numeric value represents a value of a certain entity at each corresponding time value in the set of time values. For example, a time series may be used to represent market values of an instrument. The above-mentioned "value of a certain entity" may be a particular market value at the closing of a trading day. In this example, the time series may comprise a set of long or double values, each of which represents a market value at the closing of a corresponding day as indicated by a time value in a separate set of time values. The time series further comprises the separate set of time values representing the closings of all corresponding days, for which market values of the instruments are included in the set of long or double values.

A time series may also be used to represent values of an entity for time values that meet certain criteria. For example, a time series may be used to represent market values for an instrument when the instrument is traded to higher prices, when the instrument is traded to lower prices, when the volatility of the instrument exceeds a certain limit, when the volatility of the instrument stays below a certain limit, or a derivative of other time series. Furthermore, the values of an entity are not limited to market values of an instrument. For example, the values of an entity, as represented by a time series, may comprise analytical values of historical volatility of two instruments.

In some embodiments, a time series associated with an instrument may be accessed by an expression containing an identifier (e.g., the identifier "GOOG" to indicate the equity instrument for Google, Inc.) for another object such as an instrument and a token (e.g., a textual name such as "HVOL" representing historical volatility of an instrument) for a type of transformation. In the present example where the time series is accessed by the expression "GOOG.HVOL", the metric identified by the token (e.g., "HVOL") receives the identifier for the instrument (e.g., "GOOG") as input and transforms raw trading data of the instrument (i.e., "GOOG") into a time series as an output object. This time series, for example, may represent time-dependent information of volatility of the instrument "GOOG" in all recorded trading days.

A time series can not only represent time-dependent information for zero-order objects such as instruments, but may also represent time-dependent information for any higher-order objects in the object model.

In some embodiments, a time series may be used to represent time-dependent information that is not related to another object. For example, a set of time values from a calendar, e.g., all week days, all work days, all Mondays, or the second days of months, may be transformed by a metric into a time series. Such a time series may be viewed as an object per se as it is independent of another object such as an instrument. In some embodiments, the time series may be accessed within a global scope, by any other objects, without naming any other object such as an instrument. In some embodiments, a time series may comprise a set of time values (e.g., all Mondays) without including a separate set of numeric values representing values of an entity that may be associated with another object such as an instrument.

Example Higher-Order Data Objects

Date Set: A date set comprises a set of time values that satisfy one or more selection criteria. As used herein, the term "time value" may include date and/or time of day information at various resolutions, for example, from multiple years to sub-seconds. For example, a date set may be all trading days when the "GOOG" stock trades up. A date set may also have an explicit start time value for the set, for example, Jan. 1, 2006; thus, the date set excludes all time values that are before the explicit start time value. Similarly, a date set may also have an explicit end time value; thus, the date set excludes all time values that are after the explicit end time value.

A date set may also take an implicit start time value, where an explicit start time value is not specified. For example, a date set that comprises all days when the "GOOG" stock trades up may have an implicit start time value when the "GOOG" stock was first publicly traded. Similarly, a date set may also take an implicit end time value, where an explicit end time value is not specified. For example, a date set that comprises all days when the "ENE" stock was available for trades may have an implicit end time value when the "ENE" stock was terminated from public trading from the New York Stock Exchange.

One of several object creation mechanisms may be used to create higher-order objects such as date sets. One object creation mechanism is a metric. This metric may take a first input that specifies a time series. This time series is generally a set of date/value pairs. The date set metric also may take a second input that specifies one or more criteria. For example, the one or more criteria as specified in the second input may specify a range. The resulting date set will then contain all the dates as indicated by the time series that are within the specified range.

Another object creation mechanism to create a higher-order object such as a date set is to directly use a programming language such as JAVA. The user may supply programming language code to the system 100, which may be compiled, interpreted or otherwise executed by the system 100 to create a date set. Extension mechanisms such as Java reflection may be used to add code segments or objects to the system so that the object creation mechanisms can be dynamically extended.

Yet another object creation mechanism to create a higher-order object such as a date set is to interact with a user interface. For example, tools or widgets may be provided in or through a graphical user interface and may interact with the user for the purpose of creating a date set.

In various embodiments, these and other object creation mechanisms, or a combination thereof, may be used to create various higher-order objects.

Index: An index indicates a collective value of one or more instruments as a function of time over a set of time values. A collective value is any type of aggregate value of the one or more instruments. The collective value may be of a market value type such as a total monetary value of the one or more instruments traded at public exchanges, or of an analytical value type such as a numeric value indicating volatility of the trading price for the one or more instruments, as a function of time over the set of time values.

For the purpose of illustration only, the one or more instruments included in the index may comprise the "GOOG", "YHOO", and "MSFT" stocks. Hence, the index may be an aggregate market value of these stocks, as a function of time over all trading days since Jan. 1, 2011. A market value is an aggregation of values of all assets included in the portfolio at a corresponding time value in the set of time values. The market value may be measured (e.g., denominated) in a reference currency such as the U.S. dollar. For example, a value of an asset such as an instrument may be a trading price of that instrument at the closing of a particular trading day. A value of the reference currency may be its trading value as denominated in the reference currency. A value of a currency that is not the reference currency may also be measured in the reference currency through an exchange rate.

An index may have a start time value, for example, Jan. 1, 2011; thus, the index does not track the collective value before the start time value. Similarly, an index may also have an end time value; thus, the index does not track the collective value after the end time value. The start time value and/or the end time value may be explicit or implicit.

To create an index, any of the object creation mechanisms may be used. An object creation mechanism may take a first input that specifies one or more time series for the one or more instruments. For example, these time series as specified in the first input may represent trading prices for the "GOOG", "YHOO", and "MSFT" stocks on all trading days when the stocks are publicly traded. The object creation mechanism also may take a second input that specifies a date set. In some embodiments, the date set as specified in the second input may specify a set of days for which a collective value of the one or more instruments should be tracked. For example, the date set may comprise a set of last five trading days of each quarter since Jan. 1, 2011. The object creation mechanism may comprise logic to compute the collective value of the one or more instruments as specified in the first input over the set of time values as specified in the second input. The object creation mechanism may create and output an index in the form of a new time series. Each numeric value in the set of longs or doubles indicates the collective value of the "GOOG", "YHOO", and "MSFT" stocks at a time value (e.g., a day) in the set of last five trading days of each quarter since Jan. 1, 2011.

The user may provide a token in the form of a string to name the index so that the definition or computed value of the index can be subsequently referenced as a named object in combination with other objects. In an embodiment, any of all the entities that are involved in specifying, creating and outputting a new index may be stored or cached in a machine-readable storage medium. In addition, the definition of new index may also be stored or cached in such a medium.

Instrument Group: An instrument group comprises one or more instruments selected from a universe of instruments using a filter chain that is created from zero or more set operations and one or more filter links. For example, an instrument group may comprise all the stocks in the S&P Index ("SPX") that are in the technology sector. Another example of instrument group may be all the stocks in the financial sector of the S&P Index that have low PE ratios.

To create an instrument group, an object creation mechanism may be used. This mechanism may take a first input that specifies the zero or more set operations. For example, a set operation of "intersection" may be specified as the first input. The object creation mechanism also may take a second input that specifies the one or more filter links. For the purpose of illustration only, such a filter link may be a criterion that any selected stock must belong to the bucket of lowest 10% among an input set of instruments. In some embodiments, graphical user interface 200 of client 120 may be used to create an instrument group. A filter view 206 may be used to represents an input set of instruments to which a filter link may be applied. In this example, all stocks in the financial sector of the S&P Index are used as an input set of instruments. These stocks are represented in an n-tile diagram. This n-tile diagram comprises n (a positively integer such as ten) buckets, each bucket comprising substantially a same number of instruments. Each bucket represents a particular range of 10% PE ratios. Thus, if a stock is in the top 10% among all the stocks in terms of PE ratios, the stock will be included in the bucket between 90% and 100%. Similarly, if a stock is in the bottom 10% among all the stocks in terms of PE ratios, the stock will be included in the bucket between 0% and 10%.

The object creation mechanism may comprise logic to create a filter chain by evaluating each filter link in the filter chain, combining the filter chains based on the set operation specified, and generates the instrument group that comprises the one or more instruments. In the present example, where the filter link is created using an u-tile diagram, the object creation mechanism may create and output an instrument group that comprises a set of instruments that are in the bottom 10% of PE ratios.

The user may provide a token in the form of a string to name the instrument group. For example, this instrument group may be called "low PE SPX Financials." In some embodiments, a text input box may be provided in graphical user interface to accept input of the string. Subsequently, this named instrument group may be used in combination with other objects by a reference to the token.

In an embodiment, any of all the entities that are involved in specifying, creating and outputting a new instrument group may be stored or cached in a machine-readable storage medium. In addition, the new instrument group may also be stored or cached in such a medium.

Portfolio: A portfolio indicates a market value of included assets as a function of time over a set of time values. A portfolio may comprise a start time value from which the market value of the portfolio is to be tracked. A portfolio may optionally comprise an end time value after which the market value of the portfolio is no longer tracked. The set of assets included in the portfolio at any given time value may comprise a variable number of instruments. The set of assets may optionally include a certain amount in various currencies (including currency equivalents).

To create a portfolio, an object creation mechanism may be used. This mechanism may take a first input that specifies zero or more time series for the zero or more instruments. For example, these time series as specified in the first input may represent trading prices for the "GOOG", "YHOO", and "MSFT" stocks on all trading days when the stocks are publicly traded. In some embodiments, the object creation mechanism may use weight factors to determine how much of each of these instruments is to be hold in the portfolio at each time value of a time period starting from the start time value. The object creation mechanism also takes a second input that specifies a date set. In some embodiments, the date set as specified in the second input specifies a set of time values (e.g., the preceding time period) for which a market value of the portfolio should be computed. For example, the date set may comprise a set of all trading days since Jan. 1, 2011. The object creation mechanism may further take a third input that specifies the one or more trades over the set of time values as specified in the second input. Each trade may specify an instrument, a buy-or-sell indication, a time of trading, and a quantity. The object creation mechanism may comprise logic to execute, or to simulate execution of, trades as specified in the third input and to compute the market value of the portfolio over the set of time values as specified in the second input, thereby giving rise to a new portfolio object. Any other metric may be applied to the new portfolio object to extract information. In addition, the portfolio object may be used to create another higher-order object. In the present example, the associated set of time values to which the long or double values are mapped is the set of time values specified in the second input. For example, each numeric value in the set of longs or doubles indicates a collective market value of all assets in the portfolio at a time value in the set of all trading days since Jan. 1, 2011.

The user may provide a token in the form of a string to name the portfolio so that a subsequent reference can be made to the token in an expression that involves other objects.

In an embodiment, any of all the entities that are involved in specifying, creating and outputting a new portfolio may be stored or cached in a machine-readable storage medium. In addition, the new portfolio may also be stored or cached in such a medium.

Strategy: A strategy may be used to generate a net profit in a time period. A net profit in a time period is a net gain or loss at the end of the time period. Here, the net profit may be determined by a number of trades executed within the time period and market conditions. A block of strategy code may be used to generate the trades that are to be executed in connection with the strategy. In some embodiments, the net profit and the trades may be hypothetical and generated for the purpose of studying, validating or invalidating a particular trading strategy.

The time period may be represented by a date set that comprises a starting time value corresponding to the beginning of the time period and optionally an end time value corresponding to the end of the time period.

In some embodiments, a strategy comprises an initial collection of assets at the beginning of the time period. In a particular embodiment, this initial collection of assets may comprise only a starting net asset value in a reference currency such as the U.S. dollar.

To create a strategy, an object creation mechanism may be used. This object creation mechanism may take a first input that specifies a particular date set. Comprising a start time value and optionally an end time value as previously described, the particular date set represents a time period where trades may be generated and executed. For example, the date set may be all trading days from Jan. 1, 2006 to now. Alternatively, the date set may be all trading days when the "GOOG" stock trades up.

The object creation mechanism may take a second input that specifies a statement block, which when executed generates one or more trades. Each trade may specify an instrument, a-buy-or-sell indication, a time of trading, and a quantity. The object creation mechanism may comprise logic to execute, or to simulate execution of, the statement block and the trades as generated by the statement block and to compute the market value of the strategy over the set of time values as specified in the first input, thereby creating a new strategy object. Any other metric may be applied to the new strategy object to extract information. In addition, the strategy object may be used to create another higher-order object. Furthermore, the object creation mechanism may create and output a net profit at the end of the time period. In the present example, the object creation mechanism may create and output a net profit of 72,277.21 in the reference currency of US dollar.

The user may provide a token in the form of a string to name the strategy. For example, the strategy may be named as "VLD during rising rates. Subsequently, this strategy may be used to create other higher-order objects.

In an embodiment, any of all the entities that are involved in specifying, creating and outputting a new strategy may be stored or cached in a machine-readable storage medium. In addition, the new strategy may also be stored or cached in such a medium.

Regression: A regression may be used to perform predictions, inferences and hypothesis analyses between independent time series and a dependent time series in the object model.

To create a regression, an object creation mechanism may be used. This object creation mechanism may take a first input that specifies one or more first time series representing independent variables in a regression analysis. For example, the one or more first time series may be ones that are associated with objects like "Exxon Mobil Corp", "WTI CRUDE FUTURE (1st month generic)", and "S&P 500 INDEX" in the object model. The object creation mechanism also may take a second input that specifies a second time series representing a dependent variable in the regression analysis. The object creation mechanism may comprise logic to perform the regression analysis that transforms the one or more first time series into a predicted time series and compares the predicted time series with the second time series, thereby creating a new regression object. This new regression object may be used in part by another object creation mechanism to create other higher-order objects.

The user may provide a token in the form of a string to name the regression. Subsequently, this regression may be used in combination with other objects through a reference to its token.

In an embodiment, any of all the entities that are involved in specifying, creating and outputting a new regression may be stored or cached in a machine-readable storage medium. In addition, the new regression may also be stored or cached in such a medium.

A user may define an arbitrarily complex object that is built on top of other objects. For example, liquidity and risk models may be built as a multi-level object on top of an instrument group, a portfolio, several indexes, a date set, etc. Similarly, an index may be built on top of other higher-order objects. In some embodiments, a higher-order object may be represented as a tree. The leaf nodes of the tree are zero-order objects such as instruments. The tree may additionally and/or optionally contain non-leaf nodes. The non-leaf nodes are higher-order objects. In other words, a higher-order object may be built from building blocks. These building blocks may be zero-order or higher-order objects. For example, when an index is built from an instrument group, the instrument group also may be built from a combination of other higher-order and zero-order objects.

Any of several object creation mechanisms may be selected by a user for the purpose of creating a higher-order object. Definitions for the higher-order objects may be generated by the object creation mechanism and saved in the system. A definition may be defined and evaluated at two different times. The results of evaluation of a definition may change as underlying data changes. These results may be saved in cache or in permanent storage.

In accordance with an embodiment of the present invention, an input mechanism is provided for a user to enter expressions to the application server 106 for the purpose creating, modifying, deleting, evaluating, or saving various objects and components in the object model. Here, the term "input mechanism" includes either a command line interaction mechanism or a graphic-user-interface based interaction mechanism, or a combination of the preceding two. In other embodiments, an input mechanism is not used and objects may be specified programmatically or at runtime using other mechanisms.

An expression may comprise one or more tokens separated by delimiter characters such as a period, parentheses, a comma, quotation marks, etc. Each token may refer to an economic index, an instrument, a metric, an input object, an output object, a parameter, a time series, a higher-order-object, or any higher-order object in the object model. The application server 106 receives expression evaluation requests from applications, such as the application 102, via the input receiving logic and evaluates the expressions specifies in those requests. An expression typically includes a reference to one or more data objects included in the the object model 112 and specifies one or more operations to be performed on those data objects. The application server 106, when processing a particular expression, may create, modify, delete and store data objects that are associated with the universe of data objects included in the object model 112. In addition, the application server 106 transmits the results of processing the particular expression to the application that transmitted the expression evaluation request.

The remote references engine 114 provides and manages remote data objects that can be referenced by the application 102. A remote data object is a data object, such as any of the rich data objects previously described herein, that resides within the application server 106. A remote data object can be accessed by the application 102 via a reference provided by the remote references engine 114. Thus, when accessing a data object, a property of a data object, or a method exposed by a data object, the application 102 transmits a request to the remote references engine 114 that includes the reference to the data object. The remote references engine 114 resolves the reference to identify the particular data object with which the reference is associated and returns the request data to the application 102. In such a manner, the application 102 does not have to manage large data objects within the memory of a client-side machine that typically executes such applications.

In an embodiment, application server 106 comprises data store access logic 116. Data store access logic 116 may comprise a set of program instructions which, when executed by one or more processors, are operable to access and retrieve data from data store 108. For example, data store access logic 116 may be a database client or an Open Database Connectivity (ODBC) client that supports calls to a database server that manages data store 108. Data store 108 may be any type of structured storage for storing data including, but not limited to, relational or object-oriented databases, data warehouses, directories, data files, and any other structured data storage.

Remote References

Figure 2:
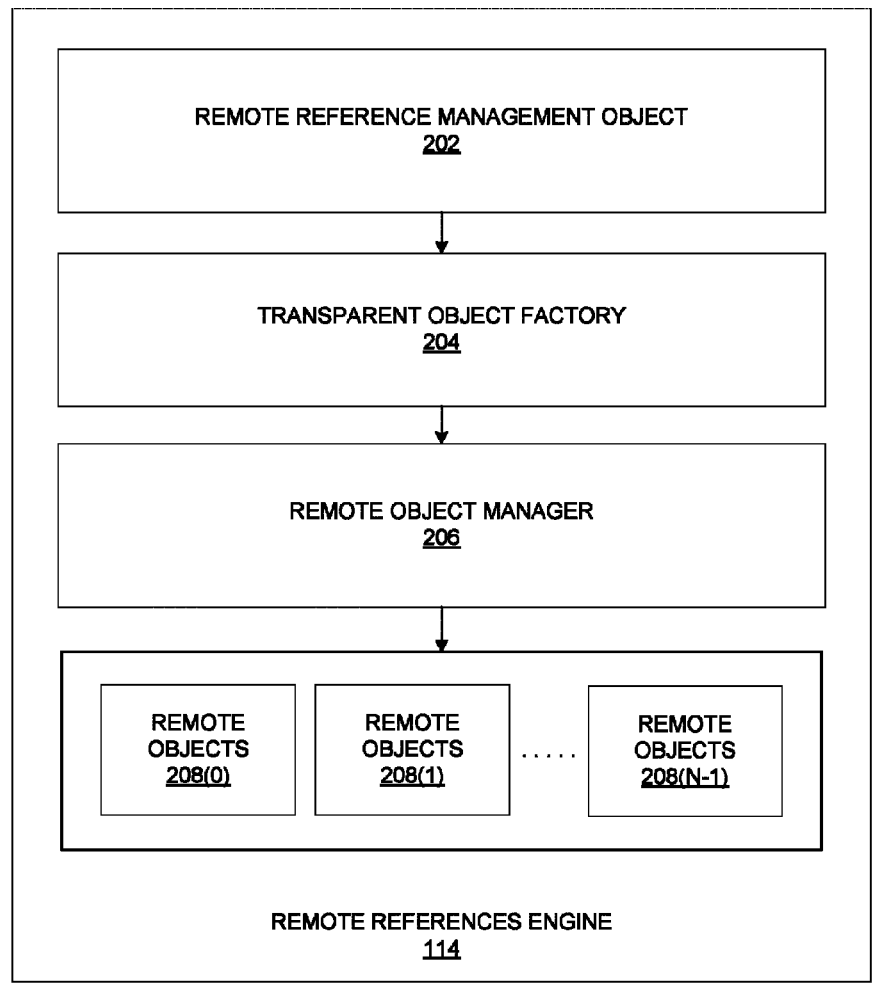
FIG. 2 illustrates a more detailed view of the remote references engine of FIG. 1, according to one embodiment of the invention.

FIG. 2 illustrates a more detailed view of the remote references engine 114 of FIG. 1, according to one embodiment of the invention. As shown, the remote references engine 114 includes a remote reference management object 202, a transparent object factory 204, a remote object manager 206 and remote objects 208.

The remote reference management object 202 communicates with the application 102 via the service logic 106 to receive requests for creating a remote reference to a data object and, in return, providing the remote reference to the application 102. In operation, the remote reference management object 202 receives a request from the application 102 for creating a remote reference to a particular type of object. In response, the remote reference management object 202 transmits an interface of the particular type of data object as well as a metric construction object that implements the interface to the transparent object factory 204.

The transparent object factory 204 communicates with the remote object manager 206 to initiate the creation of a remote object associated with the type of data object requested by the application 102. To initiate the creation of the remote object, the transparent object factory 204 transmits the metric construction object received from the remote reference management object 202 to the remote object manager 206. When the remote object manager 206 receives the metric construction object, the remote object manager 206 creates a remote data object 208 associated with the type of data object requested by the application 102. The remote object manager 206 then transmits a ticket to the transparent object factory 204 that is associated with the newly created remote data object 208 and can be used by the transparent object factory 204 as a reference to the remote data object 208.

Upon receiving the ticket associated with the remote data object 208, the transparent object factory 204 creates a proxy data object that is configured such that any calls received by the proxy data object are forwarded to the remote data object 208 via the ticket. Next, the transparent object factory 204 transmits a wrapper (referred to herein as the "remote reference of the remote data object 208") corresponding to the proxy object to the remote reference management object 202. The remote reference management object 202, in turn, transmits the remote reference of the remote data object 208 received from the transparent object factory 204 to the application 102. The remote reference is essentially a reference to the proxy object, and any accesses received via the remote reference from an application, such as the application 102, are transmitted to the proxy data object. As described above, any accesses received by the proxy data object are subsequently forwarded to the remote data object 208 via the ticket. In such a manner, the application 102 accesses methods, properties and any other data members associated with the remote data object 208 via the remote reference. Importantly, by accessing a data object remotely, the application 102 avoids maintaining a copy of the data object within the limited memory space allocated to the application 102 within a client-side machine.

In one embodiment, some information related to the remote data object 208 is stored within the remote reference. An application, such as the application 102, can, therefore, access such information from the remote reference without having to access the underlying remote data object 208 stored within the remote references engine 114.

A remote object 208 remains within the remote references engine 114 until the proxy object that references the remote object 208 is garbage collected. In operation, the remote object manager 206 keeps a weak reference to the proxy object. The weak reference allows the remote object manager 208 to track the existence of the proxy object, such that, when the proxy object is garbage collected by a lower level garbage collection procedure, any remote objects 208 that were referenced by the proxy object are also deleted. To delete a remote object 208, the remote objects manager de-allocates any memory that was allocated to that remote object 208.

Figure 3A:
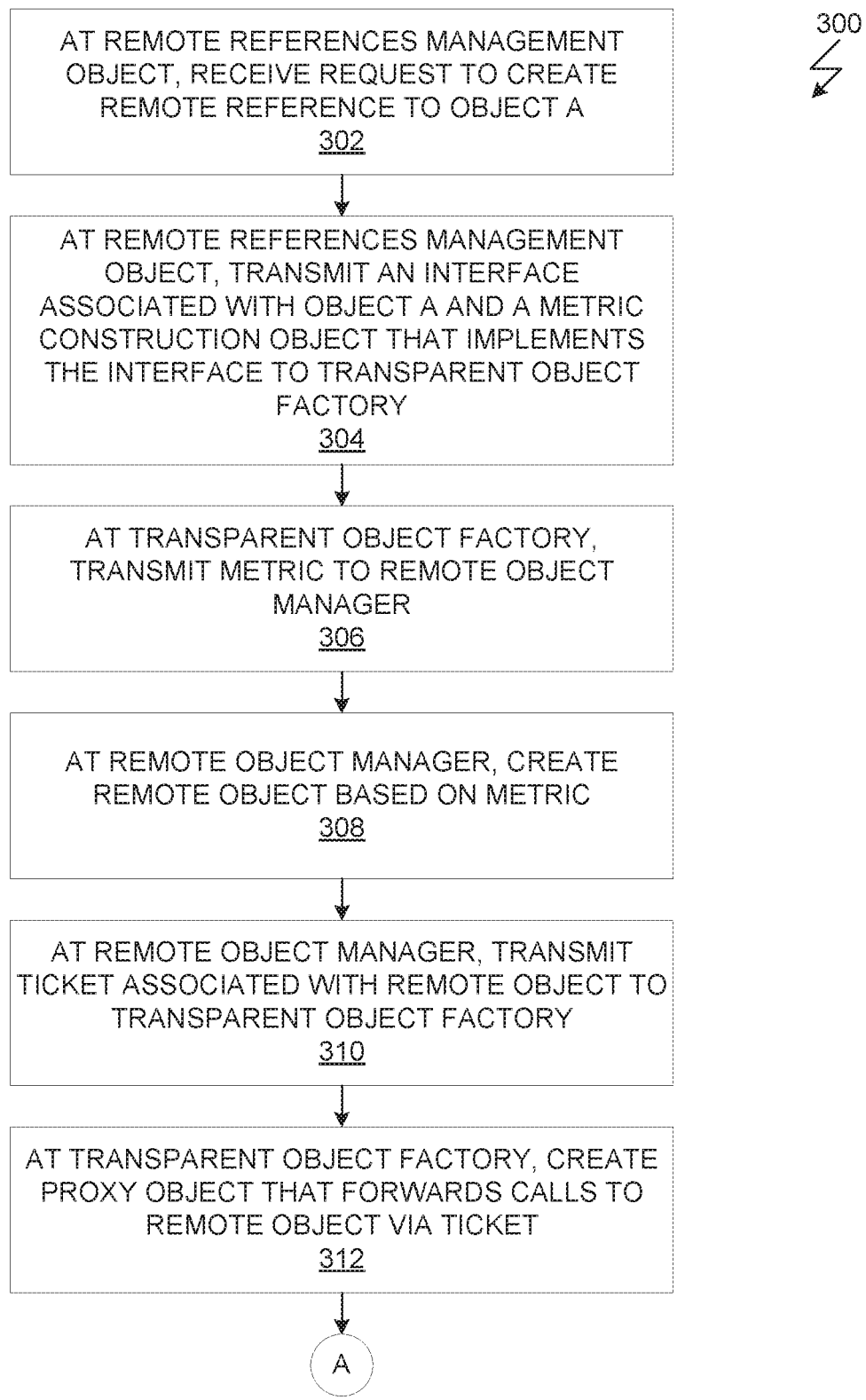
FIGS. 3A and 3B set forth a flow diagram of method steps for providing access to an object to the application via a remote reference, according to one embodiment of the invention.
Figure 3B:
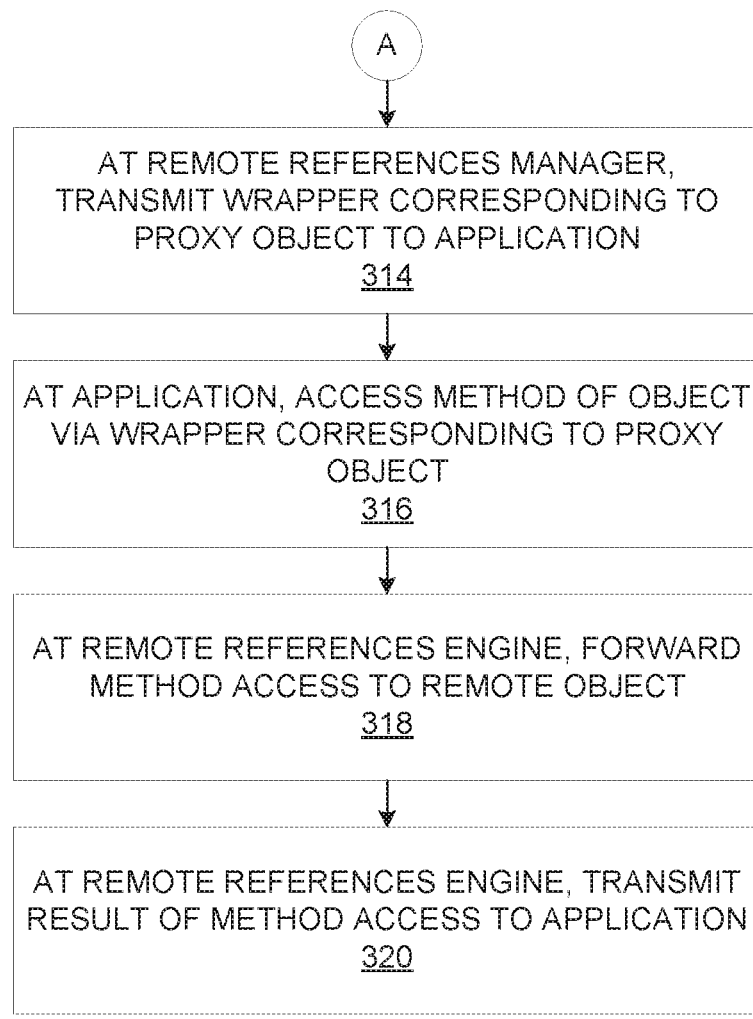

FIGS. 3A and 3B set forth a flow diagram of method steps for referencing a data object from within a spreadsheet application, according to one embodiment of the invention. Although the method steps are described in conjunction with the system for FIG. 1-2, persons skilled in the art will understand that any system configured to perform the method steps, in any order, is within the scope of the invention.

The method 300 begins at step 302, the remote reference management object 202 receives a request from the application 102 for creating a remote reference to a particular type of object. In response, at step 304, the remote reference management object 202 transmits an interface of the particular type of data object as well as a metric construction object that implements the interface to the transparent object factory 204.

At step 306, to initiate the creation of the remote object, the transparent object factory 204 transmits the metric construction object received from the remote reference management object 202 to the remote object manager 206. At step 308, when the remote object manager 206 receives the metric construction object, the remote object manager 206 creates a remote data object 208 of the type of data object requested by the application 102. At step 310, the remote object manager 206 transmits a ticket to the transparent object factory 204 that is associated with the created remote data object 208 and can be used by the transparent object factory 204 as a reference to the remote data object 208.

At step 312, upon receiving the ticket associated with the remote data object 208, the transparent object factory 204 creates a proxy data object that is configured such that any calls received by the proxy data object are forwarded to the remote data object 208 via the ticket. The transparent object factory 204 also creates a wrapper corresponding to the proxy object and transmits the wrapper to the remote reference management object 202. At step 314, the remote reference management object 202, in turn, transmits the wrapper corresponding to the proxy object to the application 102.

At step 316, the application 102 accesses a member of the remote data object 208 via the wrapper corresponding to the proxy object. A member of the remote data object 208 is a property of the data object, a method of the data object or any other data component associated with the data object. At step 318, the remote references engine 114 receives the access and forwards the access to the remote object 208. At step 320, the result of the access is transmitted back to the application 102.

Figure 4:
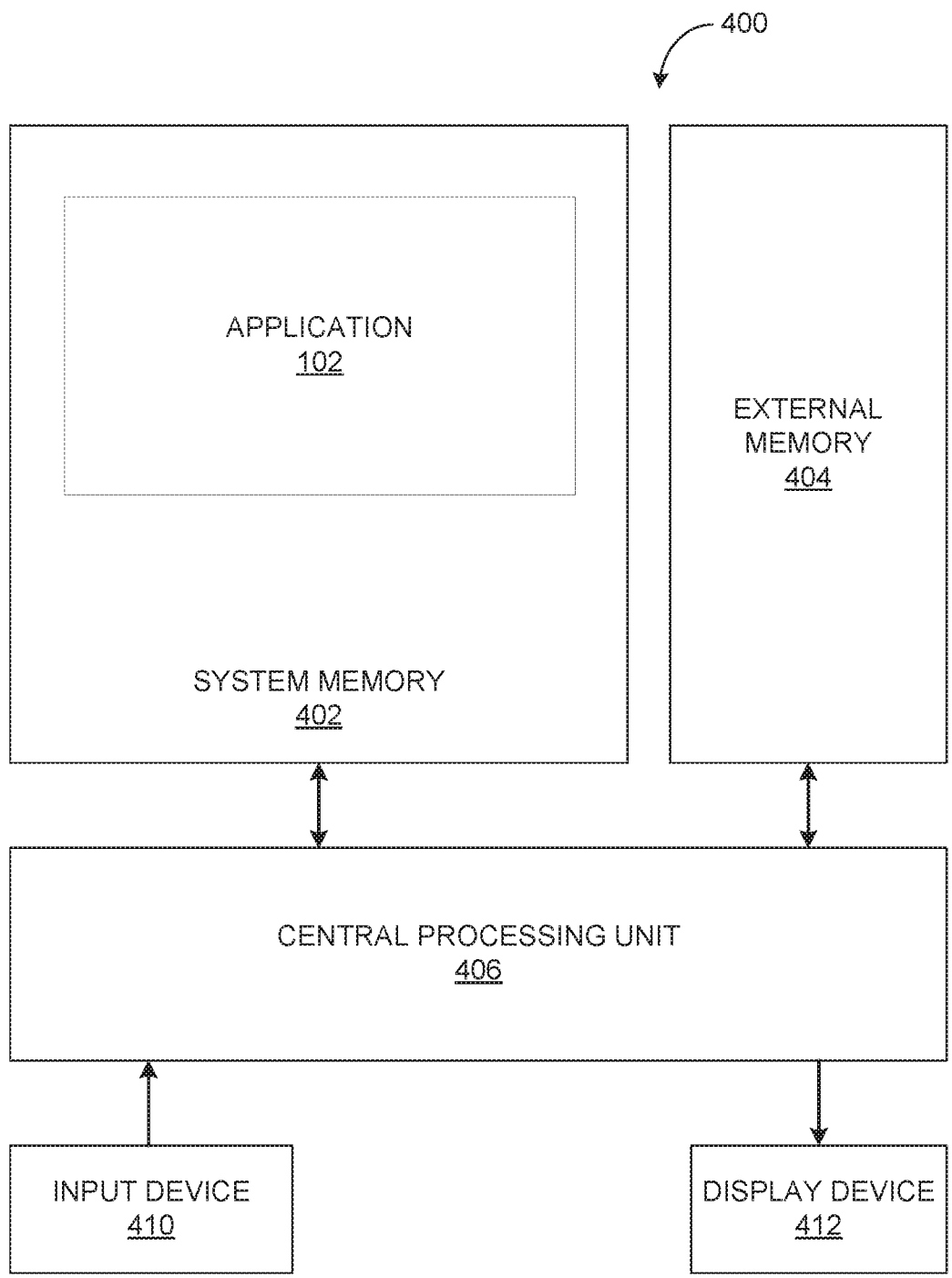
FIG. 4 is an exemplary system within which the spreadsheet application of FIG. 1 could execute, according to one embodiment of the invention.

FIG. 4 is an exemplary system within which the spreadsheet application 102 of FIG. 1 could execute, according to one embodiment of the invention. As shown, the system 400 includes a system memory 402, an external memory 404, a central processing unit (CPU) 406, an input device 410 and an display device 412.

The system memory 402 includes the spreadsheet application 102 previously described herein. The system memory 402 is a memory space, usually a random access memory (RAM), that temporarily stores software programs running within the system 400 at any given time. The CPU 406 executes a sequence of stored instructions associated with and/or transmitted from the various elements in the computer system 400. The external memory 404 is a storage device, e.g. a hard disk, for storing data associated with the video conferencing application 112. The input device 410 is an end-user controlled input device, e.g. a mouse or keyboard, that allows a user to manipulate various aspects of the spreadsheet application 102 including the UI logic 202. The display device 412 may be a cathode-ray tube (CRT), a liquid crystal display (LCD) or any other type of display device.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

I claim:

1. A method comprising:
receiving, by a first machine, from an application executing on a second machine, a request for creating a data object and a remote reference to the data object;
allocating, by the second machine, a local memory space accessible to the application executing on the second machine;
in response to the request, creating, by the first machine, the data object;
wherein the second machine does not maintain a copy of the data object within the local memory space allocated to the application executing on the second machine;
generating a ticket that references the data object;
creating, by the first machine, a proxy data object based on the ticket, wherein the proxy data object forwards calls received by the proxy data object to the data object using the ticket;
creating, by the first machine, a remote reference comprising a wrapper corresponding to the proxy data object;
transmitting the remote reference from the first machine to the application executing on the second machine;
receiving, by the first machine, a request comprising the remote reference and one or more operations to be performed on the data object;
accessing, by the first machine, at least one element included in the data object using the remote reference;
performing, by the first machine, the one or more operations based on the at least one element to produce a result;
transmitting the result from the first machine to the application.

2. The method of claim 1,
wherein the request comprises an expression that includes the remote reference and describes the one or more operations,
wherein performing the one or more operations comprises evaluating the expression.

3. The method of claim 2, wherein the expression is evaluated based on a value that is retrieved from the data object when the at least one element is accessed using the remote reference.

4. The method of claim 1, wherein the performing the one or more operations comprises by transmitting a first call to the proxy data object for accessing the at least one element that is then forwarded to the data object to access the at least one element.

5. The method of claim 1, wherein the remote reference further comprises at least one property of the data object, wherein the at least one property is accessible via the remote reference without accessing the data object via the proxy data object.

6. The method of claim 1, wherein the proxy data object exposes a plurality of elements included in the data object, including the at least one element, to the second machine.

7. The method of claim 1, wherein the at least one element comprises a property associated with the data object.

8. The method of claim 1, wherein the at least one element comprises a method that is performed on one or more properties associated with the data object.

9. The method of claim 1, wherein the wrapper further comprises at least one method of the data object, wherein the at least one method is accessible via the wrapper without accessing the data object via the proxy data object.

10. One or more non-transitory computer readable media storing instructions that, when executed by a processor of a first machine, cause the processor to perform:
receiving, by a first machine, from an application executing on a second machine, a request for creating a data object and a remote reference to the data object;
allocating, by the second machine, a local memory space accessible to the application executing on the second machine;
in response to the request, creating, by the first machine, the data object;
wherein the second machine does not maintain a copy of the data object within the local memory space allocated to the application executing on the second machine;
generating a ticket that references the data object;
creating, by the first machine, a proxy data object based on the ticket, wherein the proxy data object forwards calls received by the proxy data object to the data object using the ticket;
creating, by the first machine, a remote reference comprising a wrapper corresponding to the proxy data object;
transmitting the remote reference from the first machine to the application executing on the second machine;
receiving, by the first machine, a request comprising the remote reference and one or more operations to be performed on the data object;
accessing, by the first machine, at least one element included in the data object using the remote reference;
performing, by the first machine, the one or more operations based on the at least one element to produce a result;
transmitting the result from the first machine to the application.

11. The one or more non-transitory computer readable media of claim 10,
wherein the request comprises an expression that includes the remote reference and describes the one or more operations,
wherein performing the one or more operations comprises evaluating the expression.

12. The one or more non-transitory computer readable media of claim 11, wherein the expression is evaluated based on a value that is retrieved from the data object when the at least one element is accessed using the remote reference.

13. The one or more non-transitory computer readable media of claim 10, wherein the performing the one or more operations comprises by transmitting a first call to the proxy data object for accessing the at least one element that is then forwarded to the data object to access the at least one element.

14. The one or more non-transitory computer readable media of claim 10, wherein the remote reference further comprises at least one property of the data object, wherein the at least one property is accessible via the remote reference without accessing the data object via the proxy data object.

15. The one or more non-transitory computer readable media of claim 10, wherein the proxy data object exposes a plurality of elements included in the data object, including the at least one element, to the second machine.

16. The one or more non-transitory computer readable media of claim 10, wherein the at least one element comprises a property associated with the data object.

17. The one or more non-transitory computer readable media of claim 10, wherein the at least one element comprises a method that is performed on one or more properties associated with the data object.

18. The one or more non-transitory computer readable media of claim 10, wherein the wrapper further comprises at least one method of the data object, wherein the at least one method is accessible via the wrapper without accessing the data object via the proxy data object.

19. A computer system comprising:
a memory; and
a processor configured to perform:
receiving, by a first machine, from an application executing on a second machine, a request for creating a data object and a remote reference to the data object;
allocating, by the second machine, a local memory space accessible to the application executing on the second machine;
in response to the request, creating, by the first machine, the data object;
wherein the second machine does not maintain a copy of the data object within the local memory space allocated to the application executing on the second machine;
generating a ticket that references the data object;
creating, by the first machine, a proxy data object based on the ticket, wherein the proxy data object forwards calls received by the proxy data object to the data object using the ticket;
creating, by the first machine, a remote reference comprising a wrapper corresponding to the proxy data object;
transmitting the remote reference from the first machine to the application executing on the second machine;
receiving, by the first machine, a request comprising the remote reference and one or more operations to be performed on the data object;
accessing, by the first machine, at least one element included in the data object using the remote reference;
performing, by the first machine, the one or more operations based on the at least one element to produce a result;
transmitting the result from the first machine to the application.

* * * * *